United States Patent
Donahoe et al.

[15] 3,693,612
[45] Sept. 26, 1972

[54] MANOMETER WITH SLIDING ADJUSTABLE SCALE AND MENISCUS INDICATOR

[72] Inventors: Joseph F. Donahoe, Waukegan; Fidel V. Macalalad, Lake Forest, both of Ill.

[73] Assignee: Abbott Laboratories, North Chicago, Ill.

[22] Filed: April 21, 1970

[21] Appl. No.: 30,380

[52] U.S. Cl. ............................. 128/2.05 D, 73/402
[51] Int. Cl. ..................................... A61b 5/02
[58] Field of Search ....... 128/2.05 D, 2.05 N, 2.05 R, 128/2.05 SP, DIG. 13; 73/401, 402

[56] References Cited

UNITED STATES PATENTS

| | | | |
|---|---|---|---|
| 3,561,431 | 2/1971 | Pannier | 128/2.05 D |
| 3,529,592 | 9/1970 | Rockwell | 128/2.05 D |
| 3,495,585 | 2/1970 | Halligan et al. | 128/2.05 D |
| 3,413,970 | 12/1968 | Reynolds et al. | 128/2.05 D |
| 3,435,819 | 4/1969 | Reynolds et al. | 128/2.05 D |
| 3,456,648 | 7/1969 | Lee et al. | 128/214 |
| 3,533,400 | 10/1970 | Palich | 128/2.05 D |
| 3,120,127 | 2/1964 | Parrish | 73/401 |
| 3,541,859 | 11/1970 | Leis | 73/402 |

FOREIGN PATENTS OR APPLICATIONS

| | | | |
|---|---|---|---|
| 1,521,639 | 3/1968 | France | 128/2.5 D |
| 1,128,015 | 6/1955 | France | 73/401 |

*Primary Examiner*—Kyle L. Howell
*Attorney*—Sherman and Shalloway

[57] ABSTRACT

Disclosed herein is an improved manometer in which the calibrated scale for reading the fluid pressure is provided on a transparent sheath rather than directly on the manometer tube, the sheath being slidably mounted on the manometer tube. This sheathing permits the zero point of the scale to be readily adjusted and includes a cylindrical portion integral with a wing, the wing carrying the scale either as a direct imprint or as an insert in the wing. An indicator for marking the meniscus level encapsulates the sheathing. The indicator is slidable on the sheathing and has a mark for establishing the pressure reading for subsequent reference.

11 Claims, 2 Drawing Figures

MANOMETER WITH SLIDING ADJUSTABLE SCALE AND MENISCUS INDICATOR

This invention relates to a manometer for measuring and indicating venous pressure or pressure of other fluids in the human body.

It is well known that the central venous pressure level is determined by a complex interaction of blood volume, cardiac action and vascular alterations. Venous pressure arises primarily from the arterial pressure transmitted through the capillary bed so that when cardiovascular function is stable, the central venous pressure will vary directly with alterations in blood volume and when the blood volume and vascular dynamics are stable, the central venous pressure will vary inversely with the cardiac pump action. Under normal conditions, alterations of cardiac action and blood volume may occur independently of one another making it practically impossible to depend upon the central venous pressure as an index of blood volume alone or of cardiac pump action alone. However, the central venous pressure does serve as an index of the central circulating blood volume relative to the cardiac pump capacity. Thus, the pressure of the right atrium will reflect the competency of the heart to handle the volume of blood being returned to the heart at a particular time. The venous pressure measured in a peripheral vein is a relative indicator of the central venous pressure at the right side of the heart and, therefore, seldom used.

It has become a routine practice in many major surgical operations and post-operative care particularly in open heart procedures and geriatric cases to monitor the central pressure as a simple and effective guide to optimal blood volume maintenance.

Central and venous pressure is generally expressed in terms of the number of centimeters of fluid supported in a constant diameter tube by the hydraulic pressure within the vein. The apparatus normally employed for these venous pressure measurements is a manometer.

The manometer is a transparent tube that is calibrated to indicate the level of fluid therein. The tube is oriented vertically and is in communication with ambient pressure above the fluid level and the fluid is in communication with the vein of the patient. Thus, the motion of the column of fluid in the tube indicates the presence of pressure differentials between the blood in the vein and ambient pressure. The calibrations on the tube will normally be positioned so that the zero point of the calibrated scale is at the approximate level of the right atrium of the heart. Under these conditions, the normal individual will have a venous pressure varying between 80 and 120 millimeters in the resting state.

While manometers of this basic type have been widely accepted in the medical profession, their use in practice has been hampered by a number of practical difficulties. First, since the zero point of the calibrated scale on the manometer, in order to provide an accurate reading, must be at the level of the right atrium of the heart, any adjustment in the vertical position of the patient requires an adjustment of the manometer in order to insure an accurate reading. Manometers are generally fixed to some standard such as a bed post or a support for an administered fluid and this vertical adjustment of the manometer tube may be difficult, inconvenient or time-consuming.

Moreover, the reading taken on a standard manometer cannot be conveniently referenced or compared with a previous reading in order to determine the progress or deterioration of the patient's condition. One of the prime factors in the diagnosis of the patient's condition is to observe his venous pressure and to compare the venous pressure with an earlier reading. However, with the standard manometer, this comparison requires the observer to have recorded the previous pressure reading which, while not necessarily difficult, is a nuisance in the active routine of doctors and nurses.

With these factors in mind, it is a primary object of the present invention to provide a manometer tube having a calibrated scale, the vertical position of which can be easily adjusted.

It is another primary object of the present invention to provide a manometer with means that can be easily positioned to indicate a pressure reading for future reference.

Still a further object of this invention is to provide a manometer which includes a sheath for surrounding a tube carrying the fluid for venous pressure measurement, which sheath carries the calibrated scale of the manometer.

Still a further object of this invention is to provide a manometer having a sheath which is slidably mounted on a tube carrying the fluid representative of the venous pressure.

Yet a further object of this invention is to provide a sheath slidably mounted on the manometer tube, which sheath has a wing carrying a calibrated scale.

Still a further object of this invention is to provide a manometer including a sheath surrounding the manometer tube, which sheath is provided with a movable member on which is printed the calibrated scale.

Still a further object of this invention is to provide a manometer in which the manometer tube is surrounded by a sheath carrying a colored line parallel to the manometer tube and magnified by the fluid in the manometer tube.

Still a further object of this invention is to provide a manometer including a sheath surrounding the manometer tube and an indicator encapsulating the sheath, the indicator being slidably mounted on the sheath.

Yet another object of this invention is to provide a manometer including a sheath surrounding a manometer tube, the sheath slidable vertically on the manometer tube and an indicator encapsulating and vertically slidable on the sheath, the indicator having a slot therein for marking the calibrated scale on the sheath.

A number of the objects of the invention having been stated, other objects will become apparent to those skilled in the related art when consideration is given to the following detailed description of the embodiment chosen to illustrate the invention, which description is made in conjunction with the accompanying drawings wherein.

Figure 1:
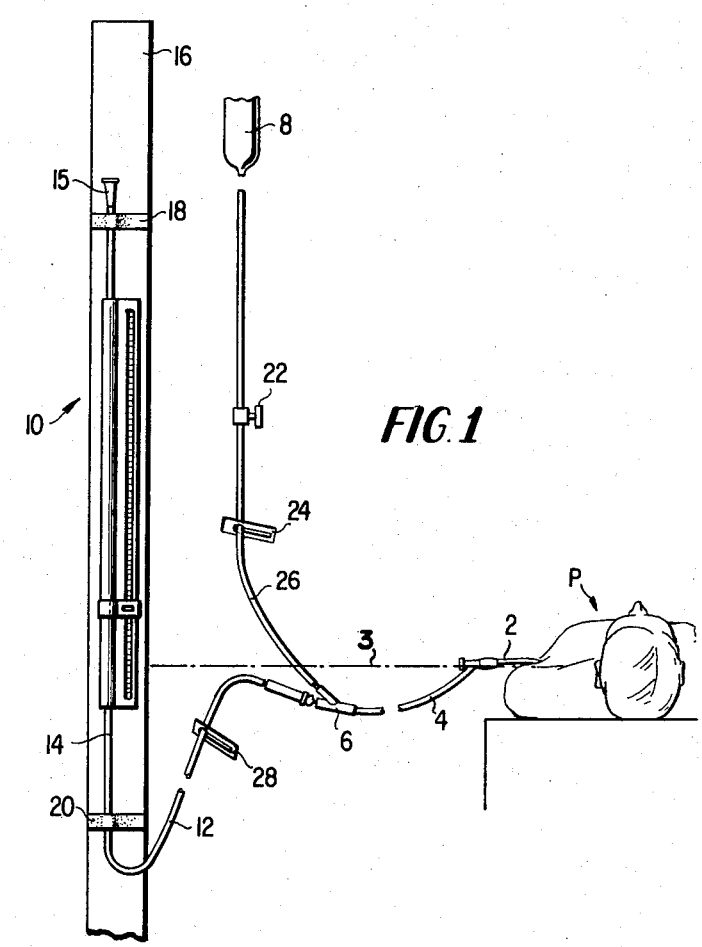
FIG. 1 is an elevation of a system employing the present invention.

Referring now to FIG. 1, the system employing the present invention is illustrated. The patient P is shown in a supine position with a catheter 2 implanted in the superior vena cava for monitoring the central venous pressure.

The catheter is connected to tubing 4 which in turn is connected or provided with a Y-branch 6 to permit connection of an administration set 8 into the system as well as the manometer indicated generally at 10. The manometer 10 is connected to the Y-branch 6 by tubing 12, and extension 14 of the tubing 12 forms the manometer tube in the embodiment illustrated.

The manometer tube 14 may be mounted to any convenient intravenous infusion stand 16 by strips of tape 18 and 20.

Positioned between the administration set 8 and the Y-branch 6 is a screw clamp 22 for controlling the rate of flow of the fluid in the infusion bottle intravenously to the patient. A slide clamp 24 is also positioned on the tubing 26 connecting the administration set to the Y-branch 6 in order to isolate the pressure of the infusion bottle from the system when a pressure reading is to be taken on the manometer 10.

A slide clamp 28 is provided on the tubing 12 to isolate the manometer from the system when a pressure reading is not being taken. The slide clamps 24 and 28 are preferred in this system over the three-way stopcock in order to avoid the confusion normally associated with valves of that nature. Moreover, the three-way stopcock often permits pressure leakage which results in an inaccurate reading on the manometer and thus is to be avoided. No leakage will occur with the system of the present invention since the slide clamps 24 and 28 fit over a continuous tubing.

Figure 2:
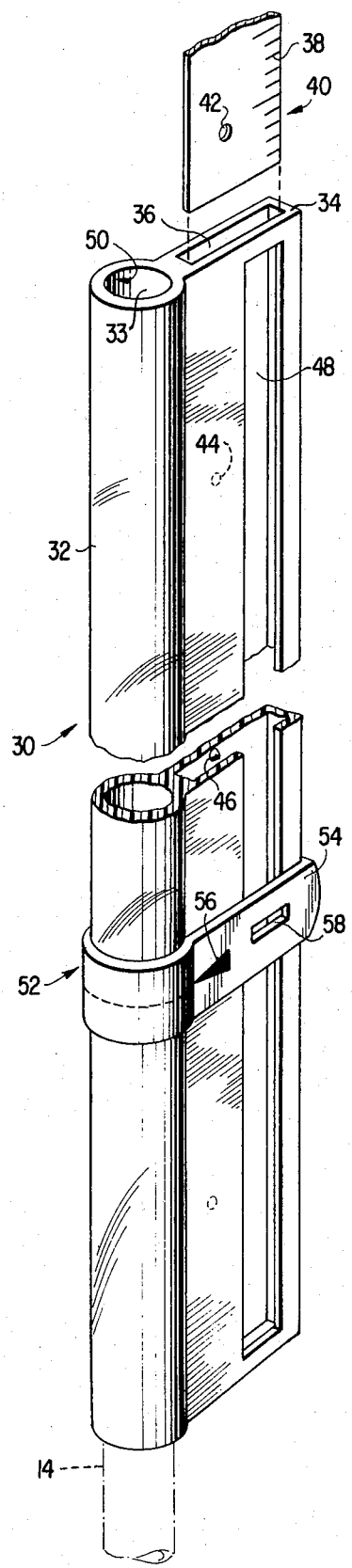
FIG. 2 is a perspective view of one embodiment of the invention.

Referring now to FIG. 2, the features of the manometer of the present invention are shown in detail. The manometer tube 14 is a clear plastic tubing so that the fluid level may be readily observed. A sheath indicated generally at 30 is shown telescoping over the tubing 14. When the tubing 14 is taped to the stand 16, care should be exercised to insure that a reasonable span of the tube extends below the midaxillary line 3 in order that the sheath 30 may be vertically adjusted on the tubing 14 either upwardly or downwardly in response to any vertical movement of the patient.

The sheath 30 includes a cylindrical portion 32 and the wing portion 34 integral therewith. The wing 34 has a chamber 36 which extends clear to the top of the wing but stops short of the bottom of the wing.

This chamber 36 is provided to receive the member 38 carrying the calibrated scale for measuring the peripheral venous pressure on the manometer. The member 38 carries a scale indicated generally at 40 and has alignment openings 42 which may be aligned with openings 44 in the wing 34, or as an alternative, bosses 46 may be provided protruding into the chamber 36 for projection into the openings 42 when the member 38 is properly aligned.

The wing 34 also has a slot 48 extending through the forward face thereof in communication with the chamber 36 so that the member 38 may be marked when a pressure reading is taken. It is, of course, to be recognized that the wing 34 could carry the calibrated scale 40 as an integral feature thereof and the member 38 would be eliminated. This is a less preferred arrangement, however, since the member 38 provides a record for the marked readings of the central venous pressure taken during the operation or post-operative care of a patient.

The reverse side of the cylindrical portion 32 of the sheath 30 is provided with a colored line 50 which is magnified by the fluid in the tube 14 so that the meniscus level can be readily observed. The calibrated scale 40 of the member 38 may also be provided with distinguishing color zones as, for example, having the centimeter readings from 2 to 10 imprinted on the member 38 in green to indicate more or less a safe normal range of venous pressure with the range of the scale from 10 to 30 being printed on the member 38 in red to provide a quick indication of a precautionary pressure level.

It will be recognized that the sheath 30 is slidably mounted on the tubing 14 so that the zero level of calibrated scale 40 may be vertically adjusted by adjusting the vertical position of the sheath. Of course, the relative dimensions of the outside diameter of the tubing 14 and the inside diameter of the opening 33 passing through the sheath must be such that some frictional engagement will be assured to prevent unwanted slippage of the sheath on the tubing.

Another significant feature of the present invention is the indicator shown generally at 52. The indicator 52 encapsulates the sheating 30 and is slidably mounted thereon so that the point of a reading may be marked. The wing portion 54 of the indicator has an arrow 56 imprinted thereon and a slot 58 forming an extension of the shank of the arrow. This slot permits a pencil to reach the member 38 so that the member may be marked for reference and after the pressure measurements have been completed, the member 38 will show a range of peripheral or central venous pressures for the patient during the period of the test. The indicator 52 and sheathing 30, it will be recognized, are preferably constructed of plastic or other clear material so that the meniscus and calibration scale may be readily observed.

The indicator 52 is extremely beneficial in both the continuous and intermittent monitoring of the venous pressure of a patient. This indicator permits the observer to immediately know if the patient's venous pressure is increasing or decreasing and thus an immediate diagnosis of the patient's condition may be made without reference to charts or other extraneous materials.

The use of the manometer of this invention is quite simple. After proper placement of the central or peripheral venous catheter, an administration set which has been previously filled with the infusion fluid is connected to the tubing 4. Administration of the fluid can begin immediately while the manometer is being connected to the system. The manometer tube having the sheathing 30 telescoping thereabout is taped to the support 16 by means of the adhesive strips. The tubing 14 should be oriented vertically in order to assure an exact reading. Next, the zero point of the calibrated scale is adjusted to the level of the midaxially line (a surface anatomical marking which ordinarily is in the same level with the right atrium) by sliding the sheathing 30 up or down the manometer tube as required. The manometer tube is now connected to the system through the remaining leg of the Y-branch 6 and generally, this is performed by providing a needle on the extremity of the tube 12 which is inserted in the sealed leg of the Y-branch.

The clamp 28 is positioned so that the manometer tube 14 communicates with the administration set 8 and the intravenous fluid flowing from the set 8 is allowed to flow up the tubing 14 until it reaches approximately the top of the scale on the member 38. At this point, the slide clamp 24 is positioned so as to isolate the administration set 8 from the system and the level of the fluid in the tube 14 will then drop to a level representative of the difference in the venous pressure and ambient pressure. This, of course, is due to the fact that the upper end of the tubing 14 is in communication with the ambient pressure through the air vent 15. The air vent is provided with a filter to prevent contamination of the infusion fluid.

Once a reading has been taken, the clamp 28 is adjusted to isolate the manometer from the system and the slide clamp 24 is loosened in order to continue the administration of the infusion fluid. Before the clamp 28 is adjusted to isolate the manometer, the indicator 52 is adjusted on the sheath 30 to the level of the meniscus so that a reference point of the venous pressure will be established. At the same time, the member 38 may be marked through the slot 58 in order to give a range of pressure readings taken while the patient is under observation.

After the administration set is connected back to the system, if at some subsequent time a second or later pressure reading is desired, the slide clamp 24 is positioned to isolate the administration set, the clamp 28 is moved to communicate the manometer with the tubing 4 and the pressure reading will be established. At this point, the new pressure level can be immediately referenced to the previous reading because of the position of the indicator 52 as well as the mark made through the slot 58. Also, at this point, the indicator 52 is repositioned to conform to the new reading and a second mark is made through the slot 58. This procedure can be repeated for as many times and as many readings as is desired.

While an illustrative embodiment has been described in detail, various modifications will occur to those skilled in the art, and the true nature of the invention will be best appreciated by the scope of the appended claims.

What is claimed is:

1. Manometer apparatus for monitoring the venous pressure of a patient comprising a transparent manometer tube adapted to be vertically mounted and carrying means at a lower end adapted for intravenous communication with a patient, a transparent elongated member frictionally and slidably engaging said manometer tube, scale means carried by said member in parallel relation with said manometer tube, and an indicator extending transversely around said member and said scale means and frictionally engaging said member and said scale means to be slidable longitudinally therealong, said indicator having an indexing mark adapted to be aligned with a level of fluid in said manometer tube.

2. Manometer apparatus for monitoring the venous pressure of a patient comprising a transparent manometer tube adapted to be vertically mounted and carrying means at a lower end adapted for intravenous communication with a patient, a transparent sheath including an elongated cylindrical portion having a bore receiving said manometer tube and having a diameter to frictionally grip said manometer tube along the length thereof, said cylindrical portion being slidable along said manometer tube, and scale means carried by said sheath in parallel relation with said cylindrical portion, said scale means being movable with said cylindrical portion whereby said scale means may be adjusted by sliding of said cylindrical portion along said manometer tuber.

3. The apparatus as recited in claim 2 wherein said cylindrical portion has a colored line extending longitudinally along substantially the entire length of said bore parallel to the axis thereof whereby said colored line is adapted to be magnified by fluid within said manometer tube in order to render the meniscus level of fluid within said manometer tube readily discernible.

4. The apparatus as recited in claim 2 wherein said sheath includes a wing portion extending radially from said cylindrical portion and carrying said scale means.

5. The apparatus as recited in claim 4 wherein said wing portion has an elongated hollow chamber therein and a longitudinal slot communicating with said chamber, and said scale means includes a strip having a calibrated scale thereon and removably inserted in said chamber with said scale aligned with said slot.

6. The apparatus as recited in claim 4 and further comprising an indicator extending transversely around and frictionally engaging said cylindrical portion and said wing portion, said indicator being slidable along said sheath and having an indexing mark thereon adapted to be aligned with a level of fluid in said manometer tube.

7. A manometer system for monitoring the venous pressure of a patient, including a vertically disposed support member, a transparent manometer tube mounted on said support member and secured at vertically spaced positions, said manometer tube communicating at its upper end with ambient pressure and at its lower end with means adapted for communication intravenously with the patient; a sheath including a longitudinally extending cylindrical portion coaxial with and slidably mounted on said manometer tube and having a transparent portion, and a wing integral with said cylindrical portion, said wing having a hollow portion and being open at its upper end; and a member carrying a calibrated scale inserted within said hollow portion of said wing, said wing including means for exposing said calibrated scale.

8. The system as defined in claim 1 and further comprising an indicator extending around said sheath and slidably mounted thereon.

9. The system as defined in claim 8 wherein said indicator includes a transparent portion extending around said sheath, an arrow disposed adjacent said transparent portion for indicating the meniscus level of a fluid within said manometer tube and a slot forming an extension of the shank of said arrow, and said wing has a longitudinal slot therein so that said calibrated scale carried by said wing of said sheath can be marked through said slot in said indicator and said slot in said wing in order to provide a record of the monitored venous pressure.

10. The system as defined in claim 1 wherein said cylindrical portion of said sheath is transparent and a colored line is provided on the inner surface of said cylindrical portion, said line extending substantially the full length of said sheath and being parallel to the axis of said cylindrical portion, said line adapted to be magnified by fluid within said manometer tube so that the meniscus level of the fluid within said manometer tube is readily discernible.

11. The system as defined in claim 1 wherein said means for exposing said calibrated scale includes a slot in the front face of said wing exposing said scale carrying member within said hollow portion whereby a recording of the monitored venous pressure may be made on the calibrated scale.

* * * * *

UNITED STATES PATENT OFFICE
CERTIFICATE OF CORRECTION

Patent No. 3,693,612                           Dated September 26, 1972

Inventor(s) Donahoe, et al.

It is certified that error appears in the above-identified patent and that said Letters Patent are hereby corrected as shown below:

Claim 8, line 1, delete "1", insert -- 7 --

Claim 10, line 1, delete "1", insert -- 7 --

Signed and sealed this 21st day of January 1975.

(SEAL)
Attest:

McCOY M. GIBSON JR.                C. MARSHALL DANN
Attesting Officer                  Commissioner of Patents